US008340872B2

(12) United States Patent
Mintah et al.

(10) Patent No.: US 8,340,872 B2
(45) Date of Patent: Dec. 25, 2012

(54) CONTROL SYSTEM AND METHOD FOR CAPTURING PARTIAL BUCKET LOADS IN AUTOMATED LOADING CYCLE

(75) Inventors: Brian Mintah, Washington, IL (US); Bassam J. Alshaer, Dunlap, IL (US); John J. Krone, Peoria, IL (US); Jeffrey K. Berry, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 1567 days.

(21) Appl. No.: 11/827,026

(22) Filed: Jul. 10, 2007

(65) Prior Publication Data

US 2007/0260380 A1 Nov. 8, 2007

Related U.S. Application Data

(63) Continuation-in-part of application No. 11/299,403, filed on Dec. 12, 2005, now Pat. No. 7,627,410.

(51) Int. Cl.
G06F 7/70 (2006.01)
G06F 19/00 (2011.01)
G06G 7/00 (2006.01)
G06G 7/76 (2006.01)

(52) U.S. Cl. .............................................. 701/50; 701/1

(58) Field of Classification Search ........................ None
See application file for complete search history.

(56) References Cited

U.S. PATENT DOCUMENTS

| | | | | |
|---|---|---|---|---|
| 4,055,255 A | * | 10/1977 | Vasquez | 414/21 |
| 4,117,610 A | * | 10/1978 | Yates | 37/409 |
| 4,230,196 A | * | 10/1980 | Snead | 177/141 |
| 4,499,960 A | * | 2/1985 | Ehrich et al. | 177/25.14 |
| 4,835,719 A | | 5/1989 | Sorrells | |
| 4,919,222 A | * | 4/1990 | Kyrtsos et al. | 177/139 |
| 4,921,578 A | * | 5/1990 | Shiraishi et al. | 177/25.19 |
| 4,964,779 A | * | 10/1990 | Sagaser | 414/708 |
| 5,067,572 A | * | 11/1991 | Kyrtsos et al. | 177/139 |
| 5,070,953 A | * | 12/1991 | Kyrtsos et al. | 177/25.14 |
| 5,082,071 A | * | 1/1992 | Kyrtsos et al. | 177/25.14 |
| 5,105,896 A | * | 4/1992 | Kyrtsos | 177/139 |
| 5,446,980 A | * | 9/1995 | Rocke | 37/348 |
| 5,528,843 A | * | 6/1996 | Rocke | 37/348 |
| 5,848,368 A | | 12/1998 | Allen et al. | |
| 5,974,352 A | * | 10/1999 | Shull | 701/50 |

(Continued)

OTHER PUBLICATIONS

Pending publication of U.S. Appl. No. 11/094,527, filed Mar. 31, 2005; Automatic Digging and Loading System for a Work Machine.

(Continued)

Primary Examiner — Khoi Tran
Assistant Examiner — Bhavesh V Amin
(74) Attorney, Agent, or Firm — Liell & McNeil

(57) ABSTRACT

An automated bucket loading control method includes determining a bucket tilt parameter for a bucket of the machine which corresponds with a partial bucket load, and capturing a partial bucket load by controllably tilting the bucket in a pile of material according to the determined bucket tilt parameter. A control system includes a sensor configured to monitor a bucket tilt parameter and output a bucket tilt signal, and further includes an electronic payload controller coupled with the sensor which is configured to output bucket tilting control commands. The electronic payload controller is further configured to determine a value for the bucket tilt parameter that corresponds with a target partial bucket load and output corresponding bucket tilting control commands during moving a bucket of the machine in a material pile to capture a partial bucket load.

20 Claims, 4 Drawing Sheets

U.S. PATENT DOCUMENTS

| | | | | |
|---|---|---|---|---|
| 6,205,687 B1 * | 3/2001 | Rocke | | 37/348 |
| 6,208,925 B1 * | 3/2001 | Creger et al. | | 701/51 |
| 6,211,471 B1 * | 4/2001 | Rocke et al. | | 177/136 |
| 6,246,939 B1 * | 6/2001 | Nozawa | | 701/50 |
| 6,321,153 B1 * | 11/2001 | Rocke et al. | | 701/50 |
| 6,858,809 B2 | 2/2005 | Bender | | |
| 7,276,669 B2 * | 10/2007 | Dahl et al. | | 177/45 |
| 7,555,855 B2 * | 7/2009 | Alshaer et al. | | 37/382 |
| 7,627,410 B2 * | 12/2009 | Berry et al. | | 701/50 |
| 2004/0117092 A1 * | 6/2004 | Budde | | 701/50 |
| 2007/0260380 A1 * | 11/2007 | Mintah et al. | | 701/50 |

OTHER PUBLICATIONS

Pending publication of U.S. Appl. No. 11/299,403, filed Dec. 21, 2005; Machine Payload Measurement Dial-A-Load System.

Pending publication of U.S. Appl. No. 11/716,453, filed Mar. 9, 2007; Velocity Based Control Process for a Machine Digging Cycle.

* cited by examiner

CONTROL SYSTEM AND METHOD FOR CAPTURING PARTIAL BUCKET LOADS IN AUTOMATED LOADING CYCLE

CROSS REFERENCE TO RELATED APPLICATIONS

This application is a continuation-in-part of U.S. patent application Ser. No. 11/299,403, filed Dec. 12, 2005 now U.S. Pat. No. 7,627,410.

TECHNICAL FIELD

The present disclosure relates generally to loading a container with a desired payload weight of loose material, and relates more particularly to capturing a partial bucket load as a final bucket load in a container loading cycle.

BACKGROUND

In quarries and other types of payload material collection sites, mobile loaders, such as wheel loaders, backhoe loaders, and track type loaders are used to load loose payload material into haul vehicles, such as over-the-road trucks. Payload information, including the desired type and amount of payload material for each truck needs to be communicated to quarry personnel who operate the loaders. For instance, this information might be transmitted from a quarry office-based computer to a mobile computer on a loader via wireless communication, as described in co-owned U.S. Pat. No. 5,848,368. This information enables a loader operator to proceed to the correct pile corresponding to the requested material.

A typical work cycle can begin with a loader operator first positioning a bucket of a loader at a pile of a requested material. The bucket is then lowered so that it is near the ground surface. The operator then advances into the pile and controls the bucket to raise the work implement through the pile, fill the bucket and lift the material. The operator then tilts or pitches the bucket back to capture a full bucket load of material. The operator then moves the loader to a desired target location, such as an over-the-road truck, and dumps the captured material from the bucket. The operator then moves the loader back to the pile to start this work cycle again. In the case of typical over-the-road trucks, depending upon their size, a full truck load will typically require between three and six full bucket loads to fill the truck with the desired material to a target load weight.

Many of today's loaders have payload control systems that allow for accurate measurements of the bucket payload. Thus, with each successive bucket, the loader can sum the load weight of the bucket loads to determine or estimate an amount of material already in the truck. Typically on a final pass of the truck loading cycle, the loader operator loads, weighs, and manually discards excess material prior to dumping the bucket load into the truck, to thereby achieve the desired truck target payload weight with a final, partial, bucket load. This process of manually discarding excess material is time consuming and wasteful since it can require trial and error weigh cycles. In the case of a typical over-the-road truck with a target load capacity of about 45 tons, it is difficult for some skilled operators to place an amount of material in the truck that is within 1,000 pounds of that target load, but does not exceed the target load. Less skilled operators require substantially more time through trial and error to fully load a truck without exceeding the target weight, while still being acceptably close to the target payload weight.

After the truck has been loaded, to determine if the truck has a desired amount of payload material therein, the truck is usually driven onto scales and weighed before leaving the quarry or other payload collection site. If the truck is overloaded, some of the payload material must be removed. Alternatively, if the truck is substantially underloaded, more payload material must be added. These processes cost additional time and money.

One strategy for dealing with these precision loading problems is described in co-owned U.S. Pat. No. 6,211,471. In that reference, the loader payload control logic determines that a final pass is needed to bring the truck payload up to a target payload weight. The control logic then controls the loader to retrieve and capture the desired weight of material into the bucket from the pile. Neutralizing the transmission, capturing material at a higher gear, and varying the amount of power available to the engine drivetrain are discussed in the '471 patent as ways to control the amount of material captured with the bucket. The captured material is then dumped into the truck to bring it up to its desired target weight. While this strategy appears to have promise, in practice there is great difficulty in precisely loading a desired weight of material in a bucket, as many variables contribute to, or detract from, the ability to accomplish this task on a reliable and repeatable basis.

The present disclosure is directed to overcoming one or more of the problems or shortcomings set forth above.

SUMMARY OF THE DISCLOSURE

In one aspect, the present disclosure provides a method of loading material with a machine including the steps of determining a bucket tilt parameter for a bucket of the machine which corresponds with a partial bucket load, and moving the bucket into a pile of material. The method further includes a step of capturing a partial bucket load at least in part by controllably tilting the bucket in the pile according to the determined bucket tilt parameter, and removing the partially loaded bucket from the pile.

In another aspect, the present disclosure provides a bucket loading control system for a machine that includes a sensor configured to monitor a bucket tilt parameter and output a bucket tilt signal, and an electronic controller coupled with the sensor and configured to output bucket tilting control commands. The electronic controller is further configured to determine a value for the bucket tilt parameter that corresponds with a target partial bucket load and output corresponding bucket tilting control commands during moving a bucket of the machine in a material pile to capture a partial bucket load.

In still another aspect, the present disclosure provides a machine having a linkage and a movable bucket coupled with the linkage. A tilt actuator is coupled with the bucket, and an electronic controller is provided which is in control communication with the tilt actuator. The electronic controller is configured to selectively capture a partial load of material with the bucket at least in part by controllably tilting the bucket within a material pile according to a bucket tilt parameter that corresponds with the partial load.

DETAILED DESCRIPTION

Figure 1:
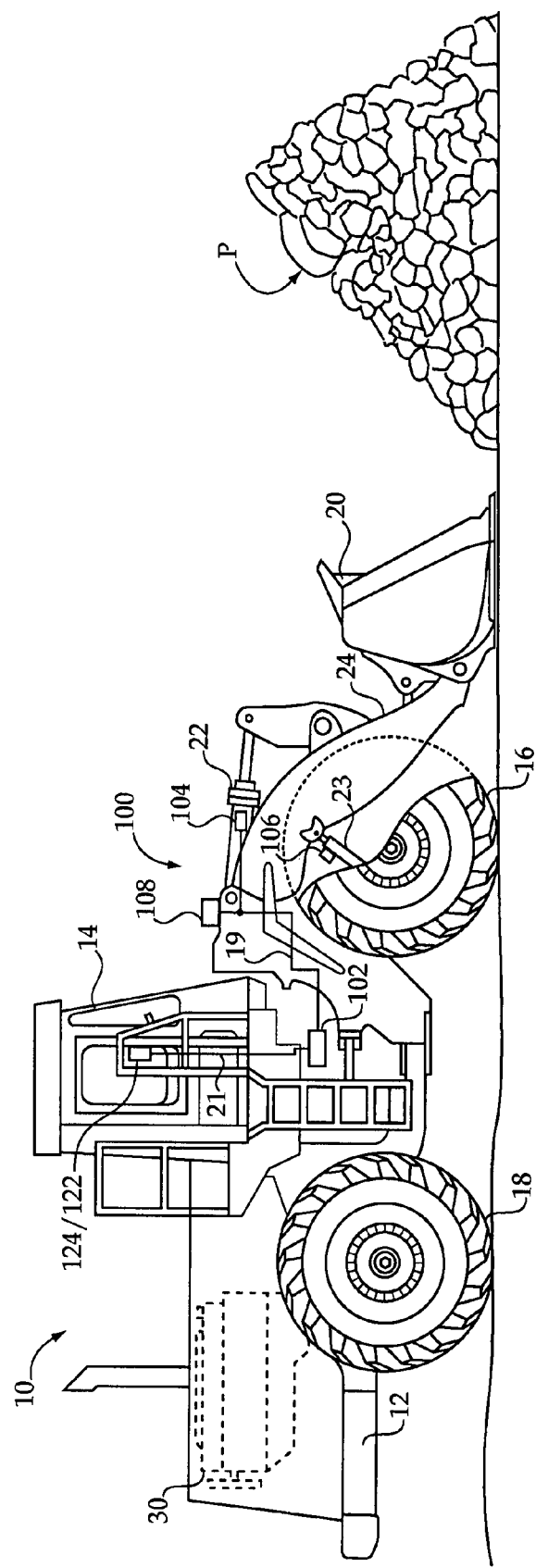
FIG. 1 is a side diagrammatic view of a machine according to one embodiment.

Referring to FIG. 1, there is shown a machine 10 having a frame 12 with a front set of wheels 16 and a back set of wheels 18. In FIG. 1, machine 10 is depicted as a wheel loader having an internal combustion engine 30, for propulsion, powering hydraulics and other machine systems, etc. Those skilled in the art, however, will appreciate that machine 10 might be any of a variety of other loading machines such as a backhoe loader, a track-type loader, or any other machine capable of loading variable weights of relatively loose material. Machine 10 might also include some other type of propulsion/power system such as a diesel engine coupled with a generator to drive electric motors. Machine 10 further includes an operator cab 14 mounted to frame 12, a linkage 24 and a bucket 20. Machine 10 is illustrated approximately as it might appear shortly before penetrating a material pile "P" to load bucket 20 with material. As will be further apparent from the following description, machine 10 is equipped to controllably capture a range of payload weights of material from pile P, enabling relatively more efficient and accurate loading of a container such as a truck, rail car, etc. In one embodiment, machine 10 will be used in a fully or partially automated loading cycle to capture and dump a plurality of full bucket loads into a container followed by capture and dump of a final, partial load, to fill a container to a target capacity, or within an acceptable error range thereof, typically less than about 1000 pounds.

To this end, machine 10 may include a loading control system 100. Control system 100 may include an electronic payload controller 102, which may comprise any appropriate electronic control module or electronic controller with appropriate programming software or hardware known in the art. Electronic payload controller 102 may receive data from at least one sensor, which can be any of a variety of sensors known in the art. In the illustrated embodiment, a displacement sensor 104 communicates a position of a bucket tilt actuator 22 to electronic payload controller 102 via a communication line(s) 19. Another displacement sensor 106 may communicate a position of a lift actuator 23 coupled with linkage 24 to electronic payload controller 102, also via communication line(s) 19. An operator input device 124 may be positioned in operator cab 14 to enable an operator to output commands to electronic payload controller 102 via another communication line 21 for various tasks. Such commands are then interpreted and transmitted to the appropriate actuators of machine 10, its systems, etc.

Figure 2:
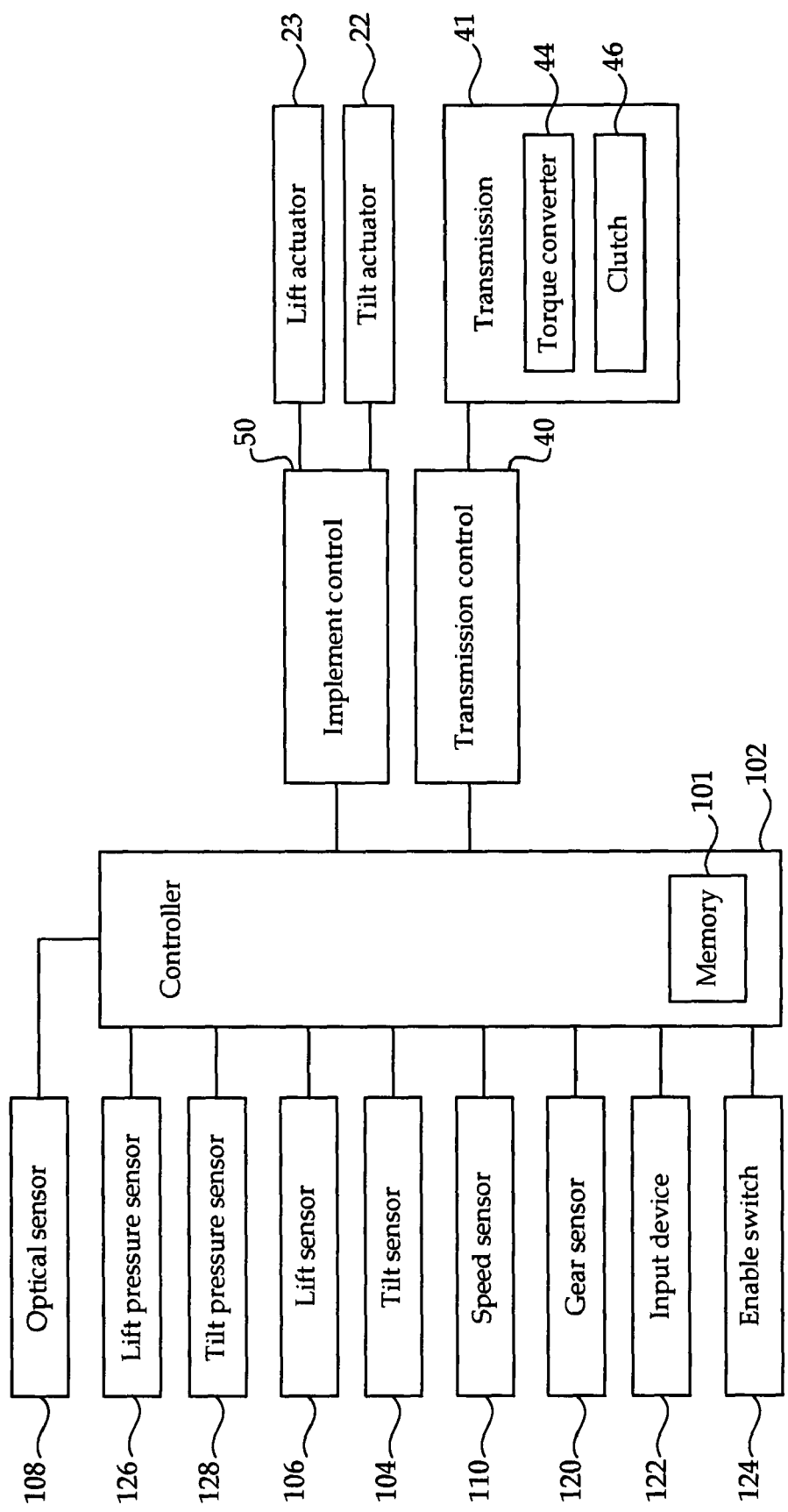
FIG. 2 is a block diagram of a control system suitable for use with the machine of FIG. 1, according to one embodiment.

Referring to FIG. 2, there is shown in the form of a block diagram control system 100 and other components of machine 10. Control system 100 may include a variety of input elements, including lift pressure sensor 126, a tilt pressure sensor 128, lift sensor 106 and tilt sensor 104, a speed sensor 110, a gear sensor 120, an input device 122, an enable switch 124 and an optical sensor 108. It is contemplated that input device 122 may be an operator input device as alluded to above. Enable switch 124 may be an activation switch configured to output a control signal for activating or deactivating an automated loading cycle control algorithm, or activating or deactivating a sub-routine of such a control algorithm, as further described herein. Switch 124 might also activate a calibration routine.

Enable switch 124 might be used to switch between a first control routine for capturing full bucket loads, and a second control routine or sub-routine for capturing partial bucket loads. In one version, an operator could capture a plurality of full bucket loads, either via manual operation or via an automated loading procedure. When a number of full loads estimated, known or calculated to be sufficient to fill a container to a state less than one full bucket load away from a target weight have been captured and dumped, the operator might flip enable switch 124 to activate the control logic for automated capture of partial bucket loads.

Lift pressure sensor 126, tilt pressure sensor 128, lift sensor 106 and tilt sensor 104, as well as speed sensor 110 and gear sensor 120 in certain embodiments, may be used in controlling and monitoring the various machine parameters necessary for execution of an automated loading cycle according to the present disclosure. To this end, the respective input elements may be configured to output signals to controller 102. An implement control element 50, coupled with tilt actuator 22 and lift actuator 23, may also be coupled with or part of controller 102. A transmission control element 40, in turn coupled with a transmission 41 having a torque converter 44 and a clutch 46, may also be coupled with controller 102.

Controller 102 may further include, or be coupled with, a memory 101 which stores various data used in implementing automated control sequences, as described herein. Memory 101 may also store data obtained during execution of one or more loading cycles, such as payload data used in executing a final, partial load of a loading cycle, and other types of data described herein which may be later used to calibrate/refine operation. Memory 101 may also store payload data for full loads, such that a summed total weight of loaded material may be determined Lift sensor 106 and tilt sensor 104 may be configured to detect a position of the lift and tilt actuators 23 and 22, respectively, and/or other information that may be used to determine a velocity, position, etc. of lift and tilt actuators 23 and 22. In one embodiment, lift and tilt sensors 106 and 104 may be associated with lift and tilt actuators 23 and 22, respectively, while in another embodiment lift and tilt sensors 106 and 104 may be associated directly with linkage 24 and/or bucket 20. Lift and tilt sensors 106 and 104 may be, for example, position sensors which measure cylinder rod extension of the respective actuators 23 and 22, but might also be rotary sensors such as rotary potentiometers, configured to determine a relative angular position of linkage 24 or bucket 20. As will be appreciated by those skilled in the art, the various sensors described herein can comprise any of a number of measurement devices selected in accordance with the particular requirements of the application, including any one or combination of the above-described devices or other devices contemplated but not specifically described herein.

Speed sensor 110 may be configured to detect a speed of machine 10 by monitoring any of a variety of machine components having a state indicative of speed or velocity of machine 10. For example, speed of engine 30, shown in FIG. 1, might be monitored by speed sensor 110. In other examples, speed sensor 110 might monitor a speed of transmission 41 or certain of its components, rotation of wheels 16 or 18, or it might comprise a radar ground speed sensor. Gear sensor 120 may be associated with transmission 41 and configured to detect an operating gear thereof. A variety of simple gear sensors known in the art might be used for providing such information.

Input device 122 may be disposed in operator cabin 14 for interfacing between an operator and machine 10 via controller 102. In one embodiment, input device 122 may include a set of levers and/or buttons which are manually manipulated by the operator to control machine 10. Joysticks, dials, a steering wheel, pedals, etc. may be parts of input device 122. As alluded to above, enable switch 124 may also be disposed within operator cab 14 and may comprise a switch such as a toggle switch or button that may be manually switched between at least two states to turn automated digging and loading on and off or to switch between activated control routines.

Lift pressure sensor 126 and a tilt pressure sensor 128 may be associated with lift actuator 23 and tilt actuator 22, respectively, to enable detection of a pressure of fluid within the respective actuators. In one embodiment, one or both of sensors 126 and 128 may be configured to output pressure signals to control module 102 which correspond with a payload weight of material within bucket 20. In one further embodiment, lift pressure sensor 126 may be configured to output signals corresponding to bucket payload data for each of a plurality of bucket loads to controller 102. As alluded to above, memory 101 may be configured to store payload data from lift pressure sensor 126, or another sensor or set of sensors, to enable a calculation of a target bucket payload weight for a final, partial bucket load, further described herein. Memory 101 may further include stored control routines, such as the automatic loading algorithm mentioned above, for controlling machine 10 to carry out an automated bucket loading process, for filling a container to a target load state.

The automatic loading control algorithm mentioned above is contemplated to enable machine 10 to capture a predetermined partial bucket load, less than a full load, and remove bucket 20 with the partial load therein from material pile P. Any of the automated bucket loading control strategies falling within the scope of the present disclosure will reflect the insight that bucket 20 may be controllably tilted within pile P during moving bucket 20 in pile P to capture a partial load less than a full load of material. The partial load may be captured in particular by controllably tilting bucket 20 according to a bucket tilt parameter. In one embodiment, the bucket tilt parameter may be a bucket tilt angle, and the partial load may be captured by controllably tilting bucket 20 in pile P from a penetration angle to a bucket tilt angle that corresponds with the predetermined partial load.

Controller 102 may be configured to determine the bucket tilt parameter, e.g. bucket tilt angle, which corresponds with a target partial bucket load. As discussed above, a target partial bucket load may be determined by storing bucket payload data for one or more full, or nearly full, bucket loads. The stored payload data may be summed, then subtracted from a target weight, to arrive at a partial bucket load weight appropriate as a final load to top off a container such as a truck. In one embodiment, memory 101 will store payload data received via inputs from lift pressure sensor 126. Controller 102 may be further configured to determine the bucket tilt parameter by referencing a map, look-up table, etc. that includes values for the bucket tilt parameter, e.g. bucket tilt angle, which correspond to partial bucket loads. In general, a relatively greater tilt angle will correspond with a relatively greater degree of filling of bucket 20. Accordingly, machine 10 may be controlled during penetrating pile P such that bucket 20 is tilted from a penetration angle, typically a neutral angle relative to a work surface, to a tilt angle determined by controller 102 based on stored bucket payload data. The greater the partial load, the more bucket 20 may be tilted during moving within pile P relative to its penetration angle. Once a partial load is captured, bucket 20 may be lifted from pile P via lift commands to lift actuator 23.

Controlled tilting of bucket 20 may take place in a closed loop fashion, wherein controller 102 receives signals from a suitable sensor such as tilt sensor 110 and confirms when bucket 20 has been tilted to a tilt angle corresponding to a target partial bucket load. Certain systems contemplated herein may actually sense bucket tilt angle, for instance via rotary potentiometers, whereas in other systems some value having a known or ascertainable relationship with bucket tilt angle, such as actuator position, might be monitored in controlling bucket tilt angle. Bucket 20 might also be controllably tilted in an open loop fashion, such as where mapped or calculated hydraulic fluid flow rate or pressure and time are used to generate control signals for actuating bucket 20.

Embodiments are also contemplated wherein aspects of bucket movement other than tilt angle in pile P, are monitored and/or controlled during capturing a partial bucket load. For example, it has been discovered that controlling bucket velocity during moving within a pile may provide one practical implementation strategy. In other words, bucket velocity, determined for example via inputs from sensors 106, 104, 110, etc., may be monitored and controlled during capturing a partial bucket load to ensure that bucket 20 is moving at or within an acceptable range of an optimal velocity. Co-pending and commonly owned U.S. patent application Ser. No. 11/094,527 to Alshaer et al. teaches one velocity based control process which might be applied in the context of the present disclosure for controlling bucket movement. Other strategies for controlling bucket movement, such as via force feedback inputs rather than velocity data, might also be used.

It may be desired to manufacture machine 10, or certain components thereof such as control system 100 and/or controller 102, such that the described automated loading strategy may be used in different environments, such as with different material types. To this end, bucket tilt data such as tilt actuator position data corresponding to a range of partial bucket loads for a plurality of material types may be stored in memory 101. Different materials such as sand, gravel, soil, etc. may have different densities. Since trucks/containers are typically loaded up to a certain target weight, the proportion of total volume capacity to which bucket 20 will be filled for final, partial loads in an automated loading cycle may vary based upon the type of material. In other words, 500 pounds of material with a first density will represent a different extent of bucket filling than 500 pounds of material of a second, different density. The prescribed bucket tilt angle for obtaining a given weight of each material will typically differ. Thus, one step in preparing machine 10 for any particular loading cycle may be selecting one of a plurality of material types, such that a bucket tilt angle corresponding to a target partial load for the appropriate material type may be determined by controller 102. The data used by controller 102 in controlling bucket 20 may be stored in the form of stored material specific curve data, with controller 102 being configured to interpolate between stored actuator position or bucket tilt angle values to obtain any given amount of material in a partial load. The appropriate angle might also be calculated with controller 102 via an equation.

In addition to material type, relative moisture content of material to be loaded can affect its density and, accordingly, can affect the bucket tilt angle and/or actuator position which will correspond with a target bucket load. In general, with relatively higher moisture content, material will be denser, and hence target bucket tilt angle/actuator position to obtain a given weight of material will tend to be less than where working with relatively drier materials.

Relative moisture content could be accounted for directly by controller 102, for example by sensing moisture, and adjusting tilt angle values via an adjustment factor. However, it may be desirable to calibrate machine 10 periodically via capturing one or more bucket loads prior to beginning work, such as at the beginning of a work day, and execution of a calibration routine may avoid any day-to-day performance deviations that might result from changes in moisture content of the material to be loaded. In one embodiment, machine 10 may be calibrated by selecting a target weight, capturing a partial bucket load, sensing a bucket payload weight of the partial load, then comparing the sensed bucket payload weight with the selected target weight. Actual calibration of machine 10 may include graduating or incrementally increasing/decreasing one or more bucket tilting terms of the automated loading control algorithm. For instance, in a calibration phase, a captured partial bucket load might be determined to actually weigh more than a target partial bucket load. This could be because, for example, a period of rain has added significant moisture to a pile of material, increasing its density. In such a case, the tilt angle to which bucket 20 is tilted may correspond to an excess weight of material within bucket 20. To calibrate electronic controller 102, an adjustment factor might be used such that mapped actuator position, bucket tilt angle data, or some other bucket tilting term, is decreased to account for the relatively greater density. Where moisture content of a given material pile has decreased, a different adjustment factor might be used to graduate/increment map data.

The automated loading control algorithm of the present disclosure may further have a learning sub-routine operating via inputs from optical sensor 108 to refine and/or calibrate operation of the algorithm. In one embodiment, sensor 108 may scan pile configuration prior to, during, or after machine 10 captures a material load from the pile, typically a plurality of times. Pile configuration data may include characteristics such as pile height, steepness, shape, or some other parameter, which may be communicated to controller 102. Sensor 108 may additionally or alternatively scan pile composition data, such as average aggregate size, median aggregate size, an aggregate size range, etc. Data obtained via sensor 108 in this manner may be stored in memory 101 and later used in calibrating controller 102, in particular refining the automated loading algorithm's accuracy in capturing partial loads with bucket 20.

INDUSTRIAL APPLICABILITY

Figure 4:
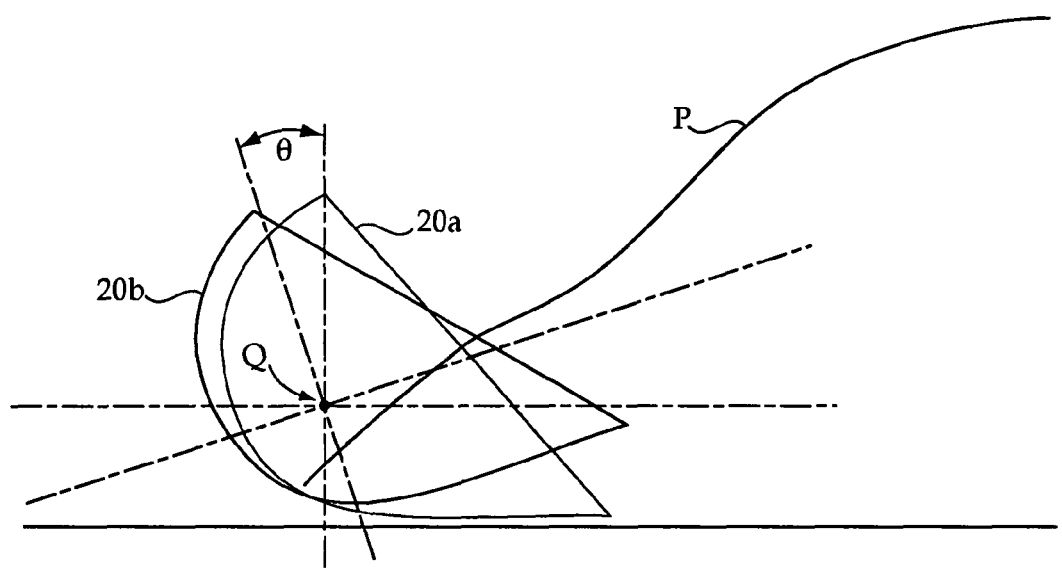
FIG. 4 is a schematic illustration of different bucket positions during a portion of an automated loading control sequence according to one embodiment.

Turning to FIG. 4, there is shown schematically a bucket at two different bucket positions/orientations, 20a and 20b. Position 20a corresponds generally to a bucket position/orientation at which bucket 20 may enter pile P, corresponding generally to FIG. 1. Position 20b corresponds generally to a bucket position/orientation at which bucket 20 has completed tilting to capture a partial load and is about to be lifted from pile P. Point Q represents an approximate axis of bucket rotation during tilting, however, it should be appreciated that machine 10 may be moving bucket 20 into pile P during bucket tilting and, hence, point Q may be considered stationary with regard to bucket 20, but not necessarily to pile P. Bucket 20 will be tilted an angle θ from its penetration angle to its final, capture angle prior to lifting bucket 20 from pile P. It will be appreciated that for different degrees of partial loading, i.e. a 25% bucket load versus a 75% bucket load, the extent of difference between positions 20a and 20b will be relatively greater.

Figure 5:
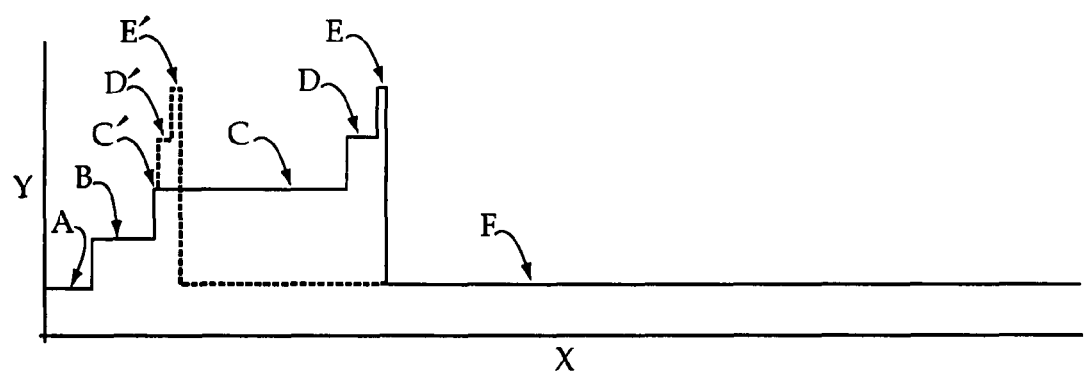
FIG. 5 is a graph illustrating signal values for automated full bucket load capture in comparison to automated partial bucket load capture according to one embodiment.

Referring also to FIG. 5, there are shown signal values (Y-axis) over time (X-axis) corresponding to execution of a full bucket load capture cycle, shown via a solid line, in comparison to a partial bucket load capture cycle, shown via a broken line. Each bucket capture cycle will typically include a plurality of active modes, including an idle phase, at which machine 10 is not interacting with pile P. The idle phase is shown for each of the full load and partial load capture cycles via segment A in FIG. 5. Following idle phase A, a penetration phase B commences at which machine 10 may be moving bucket 20 into pile P, typically at a penetration angle, approximately as shown via position 20a in FIG. 4.

Following penetration phase B, a load bucket phase C and C' for full and partial bucket loading cycles, respectively, commences. In load bucket phase C and C', bucket 20 is controllably tilted from its penetration angle to its final tilt angle. In the full bucket loading cycle, load bucket phase C may include adjusting bucket 20 from its penetration angle to a fully racked, or nearly fully racked, angle, to obtain a full bucket load. In the partial bucket loading cycle, load bucket phase C' includes adjusting bucket 20 to its partial tilt angle, as described herein. It will be noted that a duration of load bucket phase C, corresponding to capturing a full bucket load, is longer than a duration of load bucket phase C', corresponding to capturing a partial bucket load. Tilting bucket 20 to a partial tilt angle, such as position/orientation 20b is relatively faster than tilting to a fully racked position. Following the load bucket phase, C and C', a finish tilt phase D and D', respectively, may commence.

The finish tilt phase D during capturing a full bucket load may include completing fully racking bucket 20 just prior to or during lifting fully loaded bucket 20 out of pile P. When capturing a partial bucket load, the finish tilt phase D' may not actually include any change in bucket tilt angle, but instead include confirmation by controller 102 that bucket 20 is at a desired tilt angle prior to lifting partially loaded bucket 20 out of pile P. Alternatively, during the finish tilt phase D' for capturing partial loads, controller 102 might simply do nothing. Following the finish tilt portion D and D' of each of the full bucket and partial bucket control routines, a finish lift phase E and E', respectively, may commence. Finish lift may include, in either instance, lifting linkage 24 such that bucket 20 is lifted from pile P in preparation for backing out of the pile and dumping the load in bucket 20. Both control alternatives include a backing out phase F following finish tilt phase E and E'. The FIG. 5 illustration shows only two options, full load or one partial load. It should be appreciated that any partial bucket load might be obtained by interpolating or calculating values for bucket tilt angles, as described herein.

Figure 3:
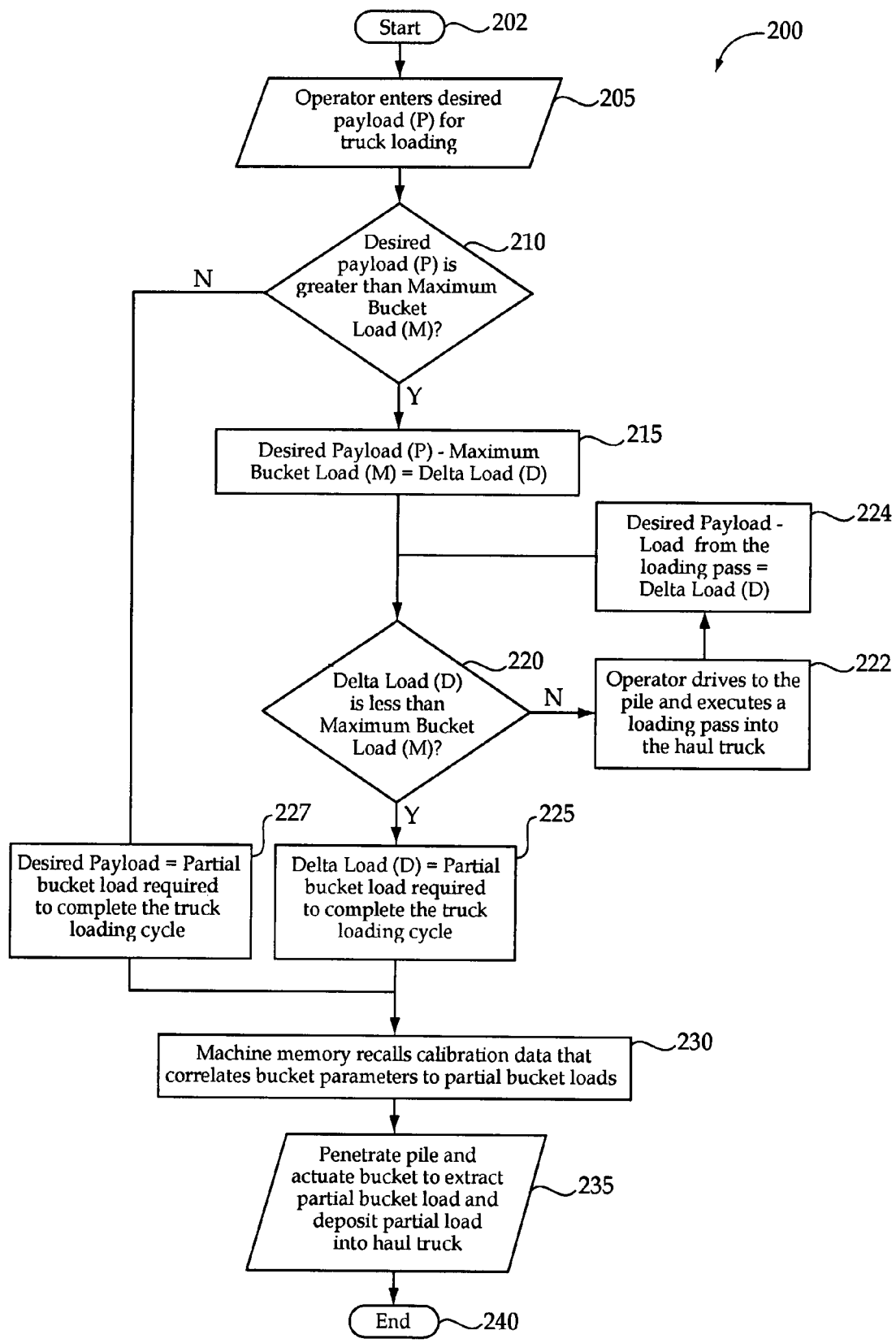
FIG. 3 is a flow diagram showing an automated loading control sequence according to one embodiment.

Turning now to FIG. 3, there is shown a flowchart 200 illustrating steps in a truck loading cycle performed with a loader such as machine 10, according to one embodiment of the present disclosure. The process of flowchart 200 may begin at a Start or initialize step 202, and then proceed to step 205 wherein an operator may enter a desired payload amount for truck or other container loading. From step 205, the process may proceed to step 210 wherein it is determined whether the desired payload is greater than a maximum bucket load, for example via controller 102. If no, the process may proceed to step 227 to determine that the desired payload is equal to a partial bucket load for completing the loading cycle.

If at step 210 the desired payload is greater than the maximum bucket load, the process may proceed to step 215 wherein a delta load is determined by subtracting a maximum bucket load from the desired payload, typically via controller 102. From step 215, the process may proceed to step 220 wherein it is determined whether the delta load is less than the maximum bucket load, also typically via controller 102. If no, the process proceeds to step 222 wherein the operator may drive to a material pile, capture a full bucket load, and execute a dump pass to a haul truck, etc. From step 222, the process may proceed to step 224 wherein a new delta load may be determined by subtracting the load captured and dumped via step 222 from the desired payload entered in prior step 205, and thenceforth return to step 220.

If at step 220, the delta load is less than a maximum bucket load, the process may proceed to step 225 wherein it is determined that the delta load is equal to a partial bucket load required to complete the loading cycle. From either of step 225 or 227, the process may proceed to step 230 wherein calibration data stored in memory 101, for example, may be used to determine bucket parameters such as bucket tilt angle which are correlated with a partial bucket load necessary to complete the loading cycle. Velocity-based control data or some other data may be accessed in step 230 in preparing for capturing of the final, partial bucket load. From step 230, the process may proceed to step 235 wherein the operator can penetrate the material pile and actuate bucket 20 as described herein to extract the partial bucket load necessary to complete the loading cycle. The partial load may then be deposited into a haul truck or the like, and the process may end at step 240.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while much of the present description emphasizes capturing a partial load to complete a multi-load cycle, the present disclosure is not thereby limited. Embodiments are contemplated wherein, rather than topping off a container, a customer may request a quantity of material less than a full bucket load, readily obtained by capturing a partial bucket load, as desired herein. The present disclosure might also be applied to obtain mixtures of more than one type of loose material, each type of material in a given mixture comprising less than a full bucket load. Controller 102 might be switched between material types to obtain prescribed amounts thereof. Other aspects, features and advantages will be apparent upon an examination of the attached drawings and appended claims.

What is claimed is:

1. A method of loading material with a machine comprising the steps of:
   moving a bucket of the machine into a pile of material;
   capturing a full bucket load of the material at least in part by tilting the bucket in the pile, and removing the fully loaded bucket from the pile at a first tilt angle;
   determining on a processor a bucket tilt parameter for the bucket which corresponds with a predetermined partial bucket load;
   moving the bucket into the pile again; and
   capturing a partial bucket load at least in part by controllably tilting the bucket in the pile according to the determined bucket tilt parameter, and removing the partially loaded bucket from the pile at a partial tilt angle less than the first tilt angle.

2. The method of claim 1 wherein the step of determining a bucket tilt parameter includes determining a value indicative of the partial tilt angle, and wherein the step of capturing a partial bucket load further comprises tilting the bucket in the pile from a penetration angle to the partial tilt angle.

3. The method of claim 2 further comprising a step of monitoring bucket velocity during capturing the partial bucket load, the capturing step further comprising controllably tilting the bucket responsive to monitoring bucket velocity.

4. The method of claim 2 further comprising the steps of storing payload data for the full bucket load preceding the partial bucket load, and selecting a target weight for the partial bucket load based at least in part on the stored payload data.

5. The method of claim 4 further comprising a step of storing bucket tilt actuator position data corresponding to a range of partial bucket loads for a plurality of different material types; and
   the step of determining a bucket tilt parameter includes determining a target bucket tilt actuator position based on the target weight and a selected material type.

6. The method of claim 5 further comprising the steps of receiving sensor inputs corresponding to bucket tilt actuator position, and confirming the bucket tilt actuator is at the target position via the sensor inputs, prior to lifting the partially loaded bucket out of the pile.

7. The method of claim 1 further comprising the steps of:
   sensing a bucket payload weight subsequent to lifting the partially loaded bucket out of the pile;
   comparing the sensed bucket payload weight with a target weight; and
   calibrating an electronic payload controller of the machine based at least in part on comparing the sensed bucket payload weight with the target weight.

8. The method of claim 7 wherein the machine is configured via executing an automated loading algorithm to capture full bucket loads, and wherein the calibrating step further comprises graduating at least one bucket tilting term of the automated loading algorithm based on comparing the sensed bucket payload weight with a target weight.

9. The method of claim 1 further comprising the steps of:
   executing a plurality of loading cycles with the machine, including capturing a plurality of partial bucket loads from at least one material pile;
   receiving at least one of, pile configuration data and pile composition data, from an optical sensor of the machine during capturing a plurality of partial bucket loads from at least one material pile; and
   calibrating an electronic payload controller of the machine based on the at least one of, pile configuration data and pile composition data.

10. A bucket loading control system for a machine comprising:
    a sensor configured to monitor a bucket tilt parameter and output a bucket tilt signal; and
    an electronic controller coupled with said sensor and configured to output bucket tilting control commands;
    said controller being further configured to determine a value for said bucket tilt parameter that corresponds with a target partial bucket load and output corresponding bucket tilting control commands during moving a bucket of the machine in a material pile to capture a partial bucket load.

11. The bucket loading control system of claim 10 wherein said parameter is a bucket tilt angle, said controller being further configured to determine said bucket is at a tilt angle corresponding to the determined value and responsively output bucket lift commands to lift the partially loaded bucket out of the material pile.

12. The bucket loading control system of claim 11 wherein:
said sensor is a first sensor, said system further comprising a payload sensor and a memory coupled with said payload sensor which is configured to store bucket payload data for a plurality of bucket loading cycles; and
said controller is coupled with said memory and configured to determine a value for said bucket tilt parameter based at least in part on said stored bucket payload data.

13. The bucket loading control system of claim 12 wherein said bucket payload sensor comprises a cylinder pressure sensor configured to output a pressure signal associated with at least one lift cylinder for a linkage of the machine.

14. The bucket loading control system of claim 12 wherein said first sensor comprises a position sensor for a bucket tilt actuator of the machine, said memory storing bucket tilt actuator position data corresponding to a range of partial bucket loads.

15. The bucket loading control system of claim 14 wherein said memory stores material specific curve data defining a plurality of different bucket tilt actuator positions corresponding to a range of partial bucket loads; and
said controller being configured to determine said value according to said material specific curve data.

16. The bucket loading control system of claim 15 further comprising an optical sensor coupled with said controller and configured to output signals corresponding to at least one of, pile configuration data and pile composition data, wherein said controller is configured via executing a calibration routine to calibrate said material specific curve data based on at least one of, pile configuration data and pile composition data, for at least one material pile.

17. A machine comprising:
a linkage;
a movable bucket coupled with said linkage;
a tilt actuator coupled with said bucket; and
an electronic controller in control communication with said tilt actuator, the electronic controller being configured to selectively capture a partial load of material with said bucket at least in part by controllably tilting said bucket within a material pile according to a bucket tilt parameter that corresponds with the partial load, and responsive to a tilt angle of said bucket.

18. The machine of claim 17 wherein said electronic controller is configured to determine a position of said tilt actuator that corresponds with a target partial bucket load and controllably tilt said bucket within a material pile by adjusting said tilt actuator to said determined position.

19. The machine of claim 18 further comprising:
a lift actuator coupled with said linkage and controllably coupled with said electronic controller;
a position sensor coupled with said tilt actuator and configured to output a bucket tilt signal;
said electronic controller being configured via executing a closed loop bucket loading algorithm to determine said tilt actuator is at said position corresponding with a partial bucket load and responsively output bucket lifting control commands to said lift actuator to lift said bucket out of a material pile.

20. The machine of claim 19 comprising a wheel loader, wherein said controller is configured to capture full bucket loads via execution of a first control routine, and configured to capture a range of partial bucket loads less than a full load via execution of a sub-routine, said machine further comprising an input device configured to output a control signal to said electronic payload controller to enable said sub-routine.

* * * * *